United States Patent
Krahl

(10) Patent No.: US 6,499,810 B1
(45) Date of Patent: Dec. 31, 2002

(54) LOCKING QUICK-RELEASE BIKE HUB SKEWER

(76) Inventor: Scott Andrew Krahl, 811 Idlewood Ave., Richmond, VA (US) 23220

( * ) Notice: Subject to any disclaimer, the term of this patent is extended or adjusted under 35 U.S.C. 154(b) by 28 days.

(21) Appl. No.: 09/858,444

(22) Filed: May 16, 2001

Related U.S. Application Data

(60) Provisional application No. 60/205,207, filed on May 18, 2000.

(51) Int. Cl.⁷ .............................................. E05B 71/00
(52) U.S. Cl. .............................. 301/124.2; 301/111.01; 70/207; 70/225; 70/233; 70/213; 403/322.4; 403/374.1; 403/374.5; 403/DIG. 4
(58) Field of Search ........................ 301/110.5, 111.01, 301/111.03, 124.2; 403/322.1, 322.4, 321, 374.1, 374.5, DIG. 4; 70/207, 213, 225, 233

(56) References Cited

U.S. PATENT DOCUMENTS

| | | | |
|---|---|---|---|
| 1,387,215 A | | 8/1921 | Wagner |
| 3,807,761 A | | 4/1974 | Brilando et al. |
| 4,028,915 A | | 6/1977 | Stahl |
| 4,033,627 A | | 7/1977 | Morroni |
| 4,400,038 A | * | 8/1983 | Hosokawa ............... 301/124.2 |
| 4,405,180 A | * | 9/1983 | Butz ....................... 301/124.2 |
| 4,621,873 A | * | 11/1986 | Weinstein et al. ........ 301/124.2 |
| 4,711,459 A | | 12/1987 | Liu |
| 4,881,390 A | * | 11/1989 | Vale ......................... 70/213 X |
| 4,951,487 A | | 8/1990 | Dennis |
| 5,193,832 A | | 3/1993 | Wilson et al. |
| 5,238,259 A | | 8/1993 | Wilson et al. |
| 5,409,321 A | * | 4/1995 | Chen ........................ 403/322 X |
| 5,516,131 A | | 5/1996 | Novotny |
| 5,526,661 A | * | 6/1996 | Lin ............................ 70/233 |
| 5,626,401 A | | 5/1997 | Terry, Sr. et al. |
| 5,630,652 A | * | 5/1997 | Cech ................... 301/124.2 X |
| 5,673,923 A | | 10/1997 | Stewart |
| 5,813,258 A | * | 9/1998 | Cova et al. .................... 70/225 |
| 6,004,064 A | * | 12/1999 | Frantz ..................... 403/322.4 |
| 6,354,119 B1 | * | 3/2002 | Molzer ..................... 70/207 X |

* cited by examiner

Primary Examiner—Russell D. Stormer
(74) Attorney, Agent, or Firm—John D. Gugliotta; P. Jeff Martin

(57) ABSTRACT

A locking quick-release bike hub skewer for securely engaging an axle of a bike includes a security lock for preventing theft. A cam member is housed within a quick-release skewer housing and is completely restrained from rotation via a tri-tumbler locking apparatus. The cam member is arranged in a combination lock type design and, therefore, cannot be rotated. In dialing in a proper lock combination, a series of locking pins which would otherwise prevent rotation of the cam about the bike's axle are aligned such that the cam member is allowed to freely spin. A pivoting lever is also provided not only for aiding in compressing the cam member against the axle, but also for removing compression of the cam member against the axle which aids in the removal of the quick-release hub once a proper lock combination has been dialed.

10 Claims, 2 Drawing Sheets

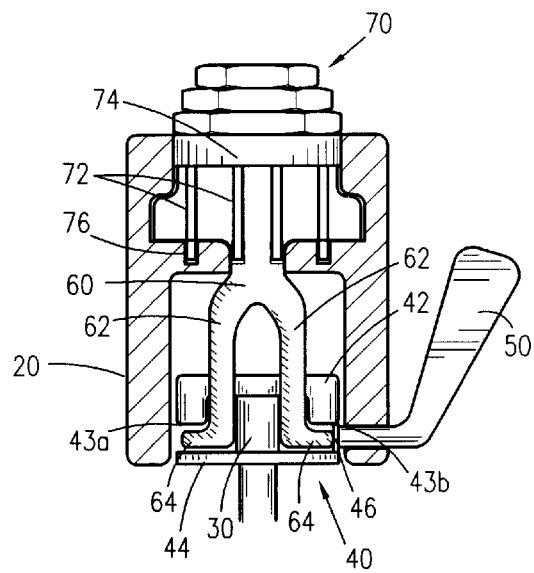
*Figure 2*
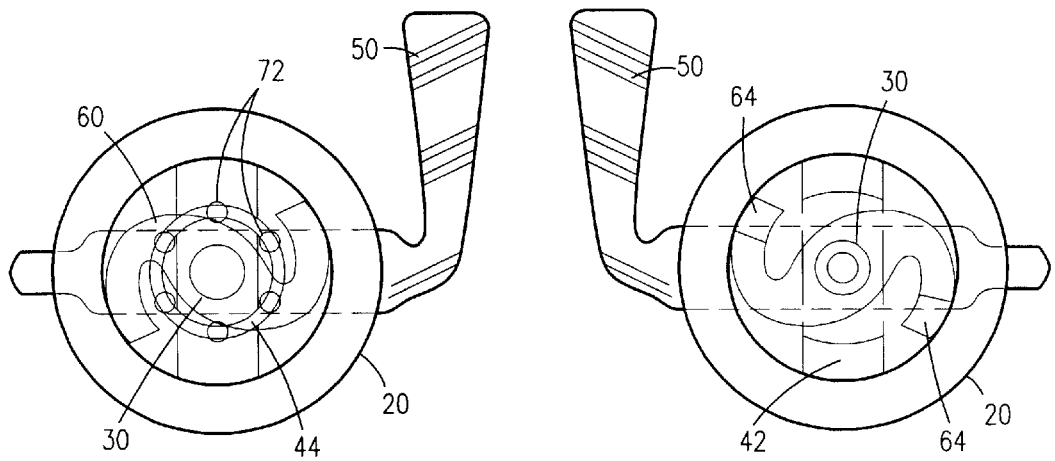
*Figure 3*   *Figure 4*

LOCKING QUICK-RELEASE BIKE HUB SKEWER

RELATED APPLICATIONS

The present invention is a conversion of a U.S. Provisional Patent Application, Serial No. 60/205,207, filed on May 18, 2000.

BACKGROUND OF THE INVENTION

1. Field of the Invention

The present invention relates generally to quick release hub assemblies and, more particularly, to a locking quick-release bike hub skewer.

2. Description of the Related Art

The use of modern technology and materials in the production of bicycles and the popularity of bicycling as a sport or hobby has resulted in a rising number of consumers who purchase high-end cycling equipment, products and accessories. Bicycles that cost in upwards of $1000–$2000 are not uncommon and it is not out of the ordinary to find items such as seats, pedals or handlebars that cost in upwards of $100 to $200. The high value of these items has made them an increasingly popular target of thieves. Furthermore, the modern technology of quick-release mechanisms has actually made stealing these items easier, allowing for their theft without the use of tools. Chains and locking mechanisms often are not effective in preventing theft due to the ability of thieves to cut through them or otherwise defeat them. Furthermore, the use of heavy locks on bicycles that seek to achieve the lightest weight possible is counterproductive.

Accordingly, there is a need for a means by which one can protect a bicycle from theft in an effective manner that is not unnecessarily burdensome.

A search of the prior art did not disclose any patents that read directly on the claims of the instant invention; however, the following references were considered related. The following patents describe a quick-release skewer system for mounting specialized bicycle wheels on bicycle forks with safety flanges: U.S. Pat. No. 5,673,925 issued in the name of Stewart; U.S. Pat. No. 5,238,259 issued in the name of Wilson et al.; U.S. Pat. No. 5,193,852 issued in the name of Wilson et al.; U.S. Pat. No. 4,951,487 issued in the name of Sheils; U.S. Pat. No. 4,711,451 issued in the name of Liu; U.S. Pat. No. 4,033,627 issued in the name of Morroni; U.S. Pat. No. 3,807,761 issued in the name of Brilando et al.; and U.S. Pat. No. 1,387,215 issued in the name of Wagner.

U.S. Pat. No. 5,626,401 issued in the name of Terry, Sr et al. discloses a hub assembly for a bicycle with a quick-release feature that can be adapted for quick-release hub assembly.

U.S. Pat. No. 5,516,131 issued in the name of Novotny discloses a quick-release skewer with trailer attachment points.

U.S. Pat. No. 4,028,915 issued in the name of Stahl describes a lever arm lock for a quick-release hub assembly.

Consequently, a need has been felt for providing a device which allows for the usefulness and convenience of a quick-release mechanism for protecting a bicycle without compromising security in a manner which is quick, safe, easy and efficient.

SUMMARY OF THE INVENTION

Therefore, it is an object of the present invention to provide a bike quick-release skewer which allows for quick and easy removal.

It is another object of the present invention to provide a bike quick-release skewer which doesn't require the use of tools.

It is another object of the present invention to provide a bike quick-release skewer which allows for quick maintenance.

It is another object of the present invention to provide a bike quick-release skewer which prevents accidental movement, flip, or rotation of a pivoting lever when the bike is ridden thus preventing the wheel from dropping out of the fork accidentally and preventing mishaps and injuries.

It is another object of the present invention to provide a bike quick-release skewer which is ideal for racing and/or competition.

It is another object of the present invention to provide a tri-tumbler locking apparatus which provides enhanced security.

It is another object of the present invention to provide a tri-tumbler locking apparatus which locks wheel hub onto bicycle frame.

It is another object of the present invention to provide a tri-tumbler locking apparatus which prevents theft.

It is still another object of the present invention to provide a device which is lightweight, yet strong and durable.

Briefly described according to one embodiment of the present invention, a locking quick-release bike hub skewer is provided which includes a security lock for preventing theft. The present invention comprises a cam member which is completely restrained from rotation via a tri-tumbler locking apparatus. Arranged in a combination lock type configuration, the cam member cannot be rotated and, therefore, the quick-release mechanism cannot be released without dialing in a correct combination. In dialing in a proper lock combination, a series of locking pins which would otherwise prevent rotation of the cam about the bike's axle are aligned such that the cam member is allowed to freely spin. A pivoting lever is also provided not only for aiding in compressing the cam member against the axle, but also for removing compression of the cam member against the axle so as to facilitate removal of the quick-release hub therefrom once a proper lock combination has been dialed.

The use of the present invention allows for the usefulness and convenience of a quick-release mechanism for protecting a bicycle without compromising security in a manner which is quick, safe, easy and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a cross-sectional view of the present invention taken along line II—II of FIG. 1 according to the preferred embodiment of the present invention;

FIG. 3 is a rear end view of the present invention showing the locking pins according to the preferred embodiment; and FIG. 4 is a rear end view of the present invention showing the retainer arm and abutment surfaces of the upper reaction member according to the preferred embodiment.

DESCRIPTION OF THE PREFERRED EMBODIMENT

1. Detailed Description of the Figures

Figure 1:
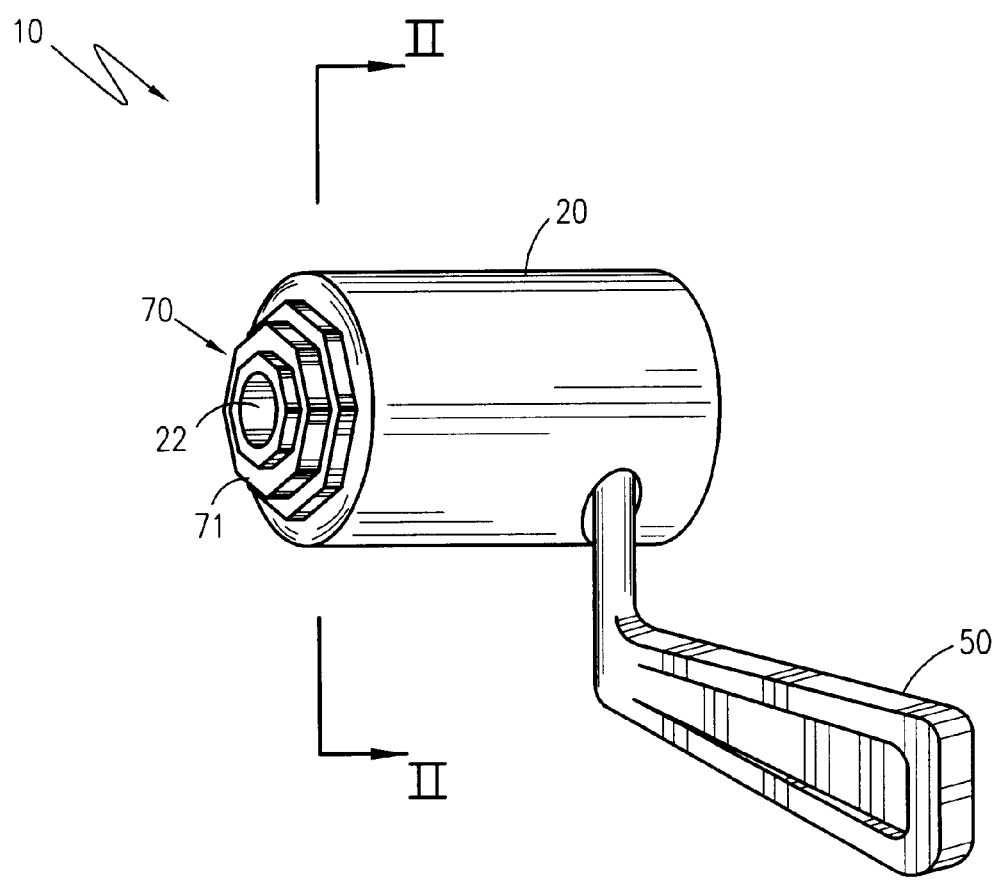
FIG. 1 is a perspective view of a locking quick-release bike hub skewer according to the preferred embodiment of the present invention.

Referring now to FIGS. 1–4, a locking quick-release bike hub skewer 10 is shown, according to the present invention, comprised of a quick-release skewer housing 20 for engaging an axle of a bicycle. The quick-release skewer housing 20 includes a cam member 30 which is mounted in parallel alignment between a clamping means 40 for being rotatably received by an end of the axle. The clamping means 40 is defined as an upper reaction member 42 opposed to a lower reaction member 44 actuated by rotating an L-shaped pivoting lever 50 suitably connected thereto which facilitates perpendicular movement, with respect to the axle, of the upper reaction member 42 and the lower reaction member 44, thereby compressing the cam member 30 against the axle so as to be retained thereto, and therefore in turn being retained to a bike frame. Reverse rotation of the L-shaped pivoting lever 50 serves to retract compression of the upper reaction member 42 and the lower reaction member 44, thereby effectively removing compression of the cam member 30 against the axle and in turn the bike frame so as to facilitate removal of the quick-release skewer housing 20 therefrom.

The upper reaction member 42 is generally of a C-shaped configuration having a pair of abutment surfaces 43a, 43b extending perpendicular from ends thereof. The lower reaction member 44 is generally of a flat, circular configuration.

Actuation of the clamping means 40 is accomplished via a longitudinal compression apparatus 46 connected between a foot of a retainer arm 60 (to be described in greater detail below) and an end of the L-shaped pivoting lever 50 which operates along the principles of a screw stamping-press, wherein rectilinear motion is obtained via circular motion from a lever, and wherein such longitudinal compression apparatus 46 is typically known and found in the prior art.

The quick-release skewer housing 20 further includes an elongated bifurcated, retainer arm 60 rotatably mounted axially within the quick-release skewer housing 20 and suitably connected at a lower portion thereof to the L-shaped pivoting arm 50 so as to effectuate partial clockwise and partial counterclockwise rotation of the retainer arm 60 upon a subsequent forward and reverse rotation, respectively, of the L-shaped pivoting lever 50.

The retainer arm 60 bifurcates into a pair of legs 62, wherein each leg 62 has a slightly curved foot 64 extending perpendicularly therefrom for engaging an abutment surface 43a, 43b of the upper reaction member 42, thereby limiting rotational movement of the retainer arm 60 when engaged thereagainst.

Rotation of the retainer arm 60, in order to facilitate engagement of each foot 64 thereof with the abutment surface 43a, 43b, is accomplished via a ¼ turn of the L-shaped pivoting lever 50. A subsequent reverse ¼ turn of the L-shaped pivoting lever 50 serves to disengage each foot 64 from the abutment surface 43a, 43b.

In order to ensure securement of the quick-release hub 20 to the axle so as to effectively prevent theft of the bicycle, a tri-tumbler locking apparatus 70 is mounted to an end of the quick-release skewer housing 20 opposite the lower reaction member 44.

The locking apparatus 70 is comprised of a series of octagonal-shaped dialing plates 71 increasing in diameter in a direction from a central point 22 to the lower reaction member 44. It is envisioned that the dialing plates 71 of the locking apparatus 70 may be configured into other polygonal shapes such as square, hexagonal and heptagonal, and would function equally well. The locking apparatus 70 has a series of reciprocating, spring-loaded, linearly elongated locking pins 72 circularly aligned and extending below a circular flange 74 mounted to an under side of the locking apparatus 70.

A series of annular locking pin slots 76, formed within the quick-release hub 20, are designed and configured so as to mate with the locking pins 72. The dialing plates 71 are configured such that upon rotation thereof, the locking pins 72 are drawn into respective locking pin slots 76, thereby preventing rotation of the cam member 30 and securably maintaining engagement of each foot 64 with the abutment surface 43a, 43b, and in turn effectively securing the quick-release skewer housing 20 to the axle so as to prevent theft. The locking apparatus 70 is further designed so as to be selectively coded by a user to a desired code and can be changed any number of times. Thus, once the user dials a correct combination via the dialing plates 71, the locking pins 72 are withdrawn from respective locking pin slots 76, which thereby allows the cam member 30 to rotate freely about the axle upon rotation of the pivoting lever 50.

The locking quick-release bike hub skewer 10 is preferably manufactured of a nickel alloy steel material; however, a variety of alternative materials can be utilized, varying in strength, weight and price, so as to accommodate higher-end users who require extremely lightweight, high performance equipment. Such fabrication materials include but are not limited to various steel alloys, aluminum, and titanium.

It is envisioned that a similar locking apparatus can be achieved utilizing a key-type mechanism as well.

2. Operation of the Preferred Embodiment

To use the present invention, the user engages the quick release skewer housing with a bike axle. Next, the user rotates the pivoting lever ¼ turn so as to both compress the clamping means against the cam member, and in turn the bike frame, and to facilitate engagement of each foot with the abutment surface. The user then rotates the dialing plates of the locking apparatus which thus serves to prevent rotation of the quick-release skewer housing, thereby assuring securement of the quick-release skewer housing to the axle so as to prevent theft.

In order to remove the present invention, the user rotates the dialing plates to the proper selected coded combination which facilitates withdrawal of the locking pins from respective locking pin slots. Finally, the user rotates the pivoting lever ¼ turn in the reverse direction thus disengaging each foot from the abutment surface so as to facilitate free rotation by the cam member about the axle, in turn releasing pressure against the bike frame, and then simply removes the present invention from the axle.

The use of the present invention allows for the usefulness and convenience of a quick-release mechanism for protecting a bicycle without compromising security in a manner which is quick, easy and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A locking quick-release bike hub skewer comprising:
   a quick-release skewer housing, said quick release skewer housing for engaging an axle of a bike for preventing theft;

a cam member, said cam member mounted in parallel alignment between a clamping means for being rotatably received by an end of the axle;

a pivoting lever, said pivoting lever is of an L-shaped configuration for compressing and decompressing said cam member against the axle;

a retainer arm, said retainer arm is bifurcated and is of an elongated configuration rotatably mounted axially within said quick-release skewer housing and is suitably connected at a lower portion of said retainer arm to said pivoting arm so as to effectuate partial clockwise and partial counterclockwise rotation of said retainer arm upon a subsequent forward and reverse rotation, respectfully, of said pivoting lever; and a locking apparatus, said locking apparatus is mounted to an end of said quick-release skewer housing.

2. The locking quick-release bike hub skewer of claim 1, wherein said clamping means is defined as having an upper reaction member opposed to a lower reaction member and is actuated by rotation of said pivoting lever which is suitably connected to said lower reaction member via a longitudinal compression apparatus which facilitates perpendicular movement of said upper reaction member thereby compressing said cam member against the axle so as to be retained to the axle.

3. The locking quick-release bike hub skewer of claim 2, wherein said upper reaction member is generally of a C-shaped configuration having a pair of abutment surfaces extending perpendicularly from ends of said upper reaction member, and wherein said lower reaction member is generally of a flat circular configuration.

4. The locking quick-release bike hub skewer of claim 1, wherein said pivoting lever is of an L-shaped configuration.

5. The locking quick-release bike hub skewer of claim 1, wherein said retainer arm bifurcates into a pair of legs, wherein each of said pair of legs has a slightly curved foot extending perpendicularly from each of said pair of legs for engaging said abutment surfaces of said upper reaction member, thereby limiting rotational movement of said retainer arm when engaged against said abutment surfaces.

6. The locking quick-release bike hub skewer of claim 2, wherein said clamping means is actuated via said longitudinal compression apparatus, wherein said longitudinal compression apparatus is connected between said foot of said retainer arm and an end of said pivoting lever.

7. The locking quick-release bike hub skewer of claim 1, wherein said locking apparatus is comprised of a series of octagonal shaped dialing plates increasing in diameter in a direction from a central point to said lower reaction member, and wherein said locking apparatus is selectively coded to a desired code and can be changed any number of times.

8. The locking quick-release bike hub skewer of claim 7, wherein said locking apparatus is further comprised of a series of reciprocating, spring-loaded, linearly elongated locking pins circularly aligned and extend below a circular flange mounted to an underside of said locking apparatus, wherein said locking pins mate with a series of annular locking pin slots formed within said quick-release skewer housing so as to prevent rotation of said cam member.

9. The locking quick-release bike hub skewer of claim 8, wherein said locking pins retract from said locking pin slots so as to allow said cam member to rotate freely upon rotation of said pivoting lever.

10. The locking quick-release bike hub skewer of claim 1, wherein said locking quick-release bike hub skewer is manufactured of a nickel alloy steel material.

* * * * *